N. H. LINDLEY.
Propagating Hot-Bed.
No. 70,584. Patented Nov. 5, 1867.
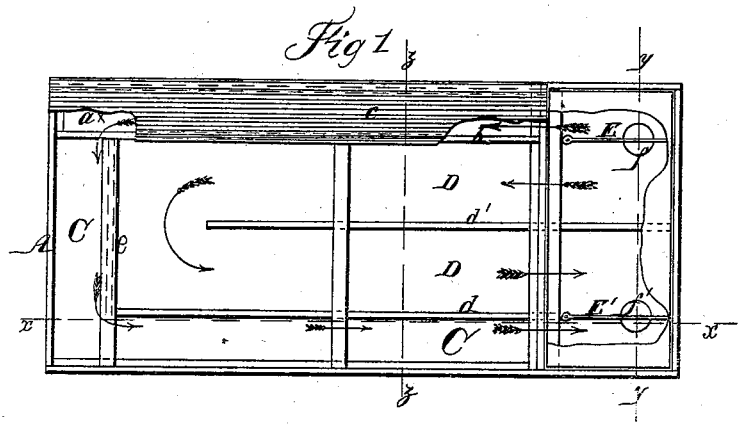
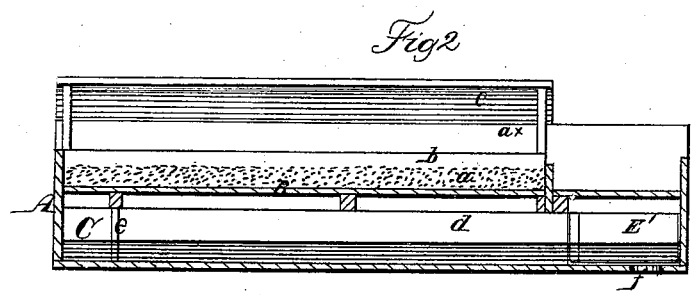
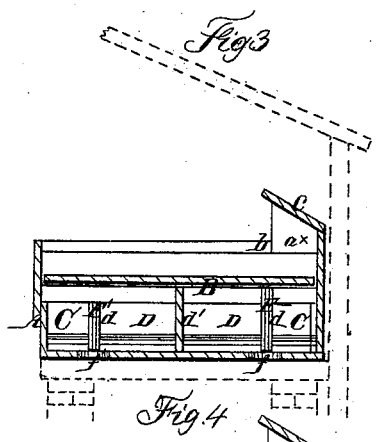
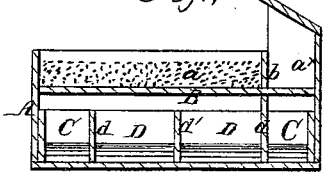
Witnesses.
Thos Tusche
W Trevin
Inventor.
N H Lindley
Per Munn & Co
Attorneys
N. PETERS, PHOTO-LITHOGRAPHER, WASHINGTON, D. C.

United States Patent Office.

N. H. LINDLEY, OF BRIDGEPORT, CONNECTICUT.

Letters Patent No. 70,584, dated November 5, 1867.

---

IMPROVEMENT IN PROPAGATING-TANK AND BED.

---

The Schedule referred to in these Letters Patent and making part of the same.

---

TO ALL WHOM IT MAY CONCERN:

Be it known that I, N. H. LINDLEY, of Bridgeport, in the county of Fairfield, and State of Connecticut, have invented a new and improved Propagating-Tank and Bed; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved application of heated water to propagating-tanks and beds in propagating-houses, and has for its object the heating of the bed to a proper or required temperature, and at the same time keeping the temperature of the house sufficiently high to avoid the condensation of vapor, and a consequent damp atmosphere within the house.

The great difficulty hitherto experienced in propagating plants by bottom heat, has been the keeping of the bed, and the house in which it is placed, at a proper temperature with one and the same heating apparatus, the house, if kept at a proper temperature in cold weather, causing the bed to be unduly heated, and if the latter be kept at a proper temperature, the house being too cold, or of sufficiently low temperature to admit of the vapor condensing, and causing the atmosphere to be damp and unfavorable to the healthy development and growth of the surrounding plants. In order to avoid this difficulty two different heating apparatuses have, in some instances, been used, but this plan is attended with great expense and considerable trouble.

By my improvement I can keep both the propagating-bed and the house at a proper temperature with one and the same heating apparatus, which may be very economically constructed. In the accompanying sheet of drawings—

Figure 1 is a plan or top view of my invention, partly in section.

Figure 2, a longitudinal vertical section of the same taken in the line $x\ x$, fig. 1.

Figure 3, a transverse vertical section of the same taken in the line $y\ y$, fig. 1.

Figure 4, a transverse vertical section of the same taken in the line $z\ z$, fig. 1.

Similar letters of reference indicate like parts.

A represents an oblong box, which may be constructed of slate, or other material, so as to be perfectly water-tight, and of any suitable length and width, according to the dimensions of propagating-bed required. In this box there is placed a horizontal slate partition, B, upon which the earth or sand $a$, which forms the propagating-bed, is placed, as shown clearly in figs. 2 and 4. The propagating-bed does not extend the whole width of the box A, an upright partition, $b$, being placed on the partition B, so as to leave an open space, $a^\times$, at one side of the bed, the whole length of the same, and over which there is an inclined plate or deflector, $c$, the use of which will be presently shown. Underneath the partition B, within the lower compartment of the box A, there are placed three longitudinal partitions, $d\ d\ d'$, and a transverse partition, $e$, all of which are shown clearly in fig. 1. The longitudinal partitions $d\ d$ and the transverse partition $e$ are near the sides and end of the box, and form a water-channel, C, all around it, while the central longitudinal partition $d'$ forms a return-water passage or channel, D, underneath the central portion of the bed $a$. In one end of the box A, opposite to the end where the transverse partition is placed, there are made two openings, $f\ f'$, $f$ being the induction opening, through which the hot water is admitted into the lower part of the box, and $f'$ the opening through which it is discharged, said holes communicating, by means of pipes, with a boiler, by which a constant circulation is kept up through the water-passages in the lower part of A. In the box A there are placed two valves, E E', in such a relative position with the openings $f\ f'$, that, by adjusting said valves, the hot water may be cut off from the passage or channel C, which extends all around the edge of the bed, and made to pass only through the passage or channel D, or made to pass through the channel or passage C and be cut off from D, or made to pass through both, as may be required.

By this simple means it will be seen that when the bed $a$ requires bottom heat, and the temperature of the house is sufficiently high, the hot water is allowed to circulate through the channel D only, and when the temperature of the house is too low, the hot water is allowed to flow through the channel C, and more or less through D, as may be required, the open space $a^\times$ and the deflector $c$ causing a warm current of air to pass over the surface of the bed into the house to carry off all vapor, and prevent the condensation of the same. The hot water in the channel C throws heat into the house without appreciably heating the bed, and hence both the bed and the house, by regulating the flow of water in the channels, as specified, may always be kept at the proper temperature.

This device may be very economically put up, as water pipes, which are very expensive, are avoided. The deflector $c$ prevents the drip from the roof passing into the space $a^\times$, and therefore performs a double function.

Having thus described my invention, I claim as new, and desire to secure by Letters Patent—

The valves E E', as described, and their adjustability in combination with the hot-water channels C D, propagating-bed $a$, hot-air space $a^\times$, and deflector $c$, substantially as described for the purposes specified.

N. H. LINDLEY.

Witnesses:
    AMOS FULLER,
    WM. B. NICHOLS.